Figure 1:
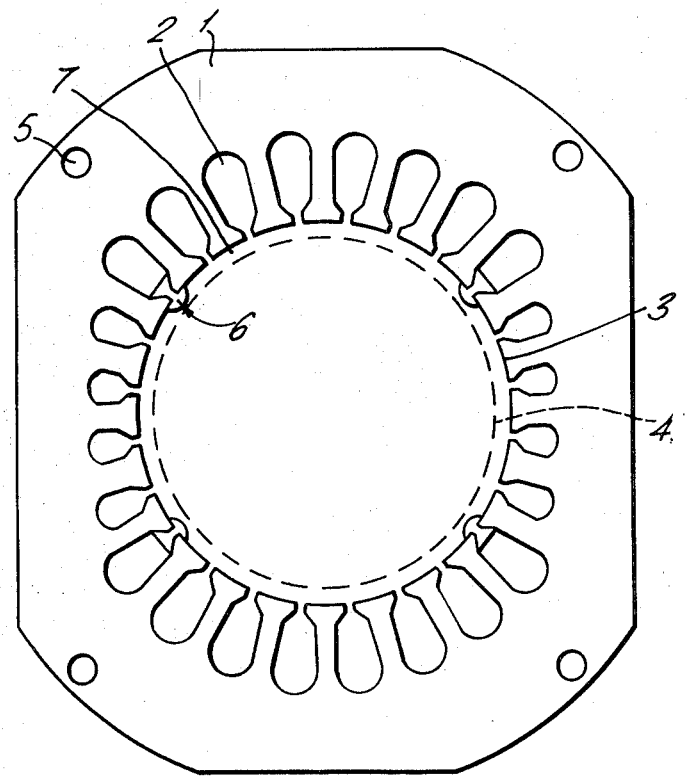

United States Patent
Nielsen

[11] 3,719,988
[45] March 13, 1973

[54] METHOD OF CENTERING THE ROTOR OF AN ELECTRIC MOTOR IN ITS STATOR

[75] Inventor: Borge Niels Jorgen Nielsen, Augustenborg, Denmark

[73] Assignee: Danfoss A/S, Nordborg, Denmark

[22] Filed: Jan. 4, 1971

[21] Appl. No.: 103,608

[30] Foreign Application Priority Data
Jan. 13, 1970 Germany.................P 20 01 179.4

[52] U.S. Cl.................29/596, 29/271, 33/181 R, 310/42, 310/214
[51] Int. Cl....H02k 15/00, H02k 15/14, H02k 15/16
[58] Field of Search ..29/596, 598, 271; 310/42, 214; 33/174 Q, 180 R, 181 R

[56] References Cited

UNITED STATES PATENTS

| | | |
|---|---|---|
| 2,443,455 | 6/1948 | Herman................310/214 |
| 3,605,257 | 9/1971 | McMahon.............29/596 |
| 3,176,380 | 4/1965 | Wightman............29/596 |

Primary Examiner—Charles W. Lanham
Assistant Examiner—Carl E. Hall
Attorney—Wayne B. Easton

[57] ABSTRACT

The invention relates to a method for centering the rotor of an electric motor relative to the stator thereof so that a uniform, circumferentially extending air gap is achieved. Spacer elements are used in the manufacture or repair of a motor which are inserted into some of the winding grooves of the stator, these elements each having a head which projects beyond the groove to an extent equal to the width of the air gap. The elements are made of a heat shrinkable material and heat generated by motor current causes the heads to be withdrawn into the grooves as a result of the shrinkage of the material.

9 Claims, 7 Drawing Figures

PATENTED MAR 13 1973 3,719,988

METHOD OF CENTERING THE ROTOR OF AN ELECTRIC MOTOR IN ITS STATOR

The invention relates to means for centering the rotor of an electric motor in its stator and to a method of centering employing this means.

When an electric motor is assembled, the rotor and stator must be centered relative to each other. This is generally done by inserting a number of feelers between the stator and the rotor, these feelers corresponding to the air-gap and being distributed over a circle; the relative positions of the rotor and stator are then fixed, for example by screwing the stack of stator laminations on to a supporting element comprising the rotor bearing. For this purpose, however, it is necessary for the air-gap to be accessible from at least one end face. If the motor has two end cover-plates each having a bearing, or if the stator winding covers the air-gap, this method cannot be used. Furthermore, the feelers have to be inserted in the air-gap prior to centering and then have to be withdrawn again.

The object of the invention is to indicate a way of considerably simplifying the centering operation.

According to the invention, this object is achieved by inserting filling elements in at least a few grooves, these elements each having a head that projects beyond the groove to an extent equal to the width of the air-gap and the elements being made of shrinkable material.

These filling elements, three or four of which are sufficient, can be inserted into the grooves when the winding and the elements for closing the grooves are inserted in the grooves. After centering, the heads can be withdrawn into the grooves simply as a result of shrinkage of the material. If the material shrinks under the action of heat, contraction can be achieved by the heat generated by the motor current. This is considerably more simple than the operation of inserting feelers into the air-gap prior to centering and subsequently removing the feelers. Furthermore, it is no longer necessary for the air-gap to be accessible from one of the end faces. Since the air-gap is generally only of small width, e.g. 0.3 mm, the projecting head likewise needs only to be of slight thickness. Thus, a relatively small degree of shrinkage suffices for retracting the head into the nut.

It is particularly advantageous if the filling elements constitute the elements for closing the grooves. They can then be inserted at the same time as the other elements for filling the grooves, so that no additional operation is required. Furthermore, the entire cross-section of the element for closing the groove is then available for the shrinking operation.

Very useful results have been obtained when the filling elements were of hollow cross-section. Reduction of the periphery, occurring during shrinkage, leads to the head being retracted into the groove in a positive manner.

That portion of each filling element contained in the groove should be of such width that it does not fall below the width of the mouth of the groove when shrinkage takes place. This ensures that the filling elements cannot fall out of the groove when the motor is running. In addition to, or instead of this, the filling elements may be of widened cross-section at at least one end. The filling elements can be firmly clamped at the ends of the grooves or in the adjacent portions of the winding by means of this widened cross-sectional portion.

The material of which the filling elements are made can be selected from a large number of insulating materials which also possess the requisite ability to contract. When the invention is applied to a refrigerating machine where the material of the filling elements has also to be capable of resisting the action of the refrigerant and the refrigerant-oil mixture, the recommended material is polyvinyl fluoride.

A method of centering by means of the devices described is characterized in that after the parts of the motor have been fixed in the centered position, a current which generates the shrinking temperature is passed through at least a portion of the winding. Particular advantage accrues if the filling elements are inserted in grooves that accommodate the starting winding. A high temperature which causes shrinkage can be achieved relatively rapidly with the help of the starting winding.

Figure 2:
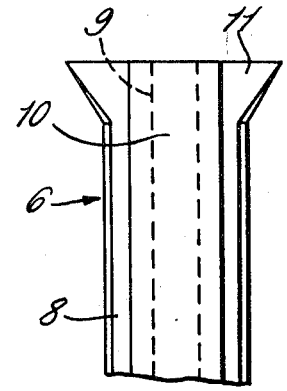
Figure 3:
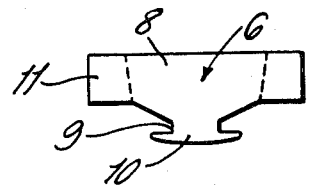
Figure 4:
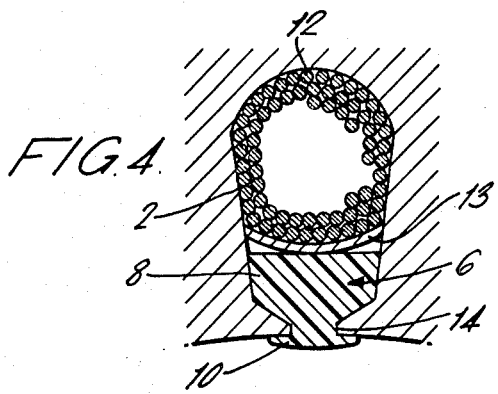
Figure 6:
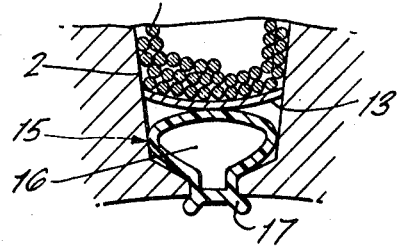
Figure 5:
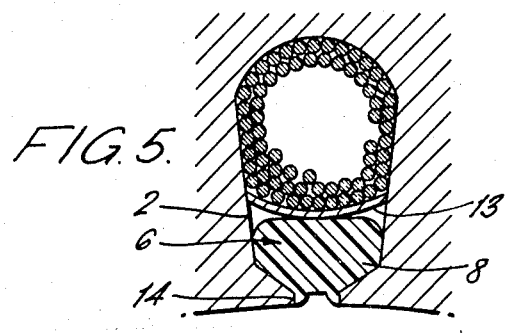
Figure 7:
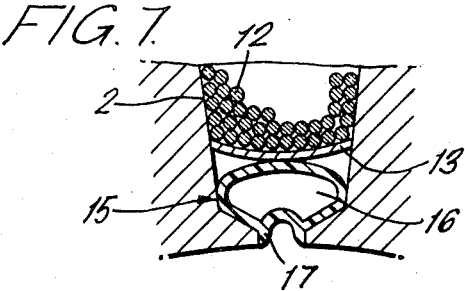

The invention will now be described in more detail by reference to the drawing, in which:

FIG. 1 is a schematic end-view of the stator in which only the filling elements in accordance with the invention, and the rotor are shown, the latter in broken lines, FIG. 2 is a plan view of a filling element, FIG. 3 is an end-view of a filling element, FIG. 4 shows the filling element of FIGS. 2 and 3 in the operative position for centering, FIG. 5 shows the filling element of FIG. 4 after shrinkage, FIG. 6 illustrates a further form of the filling element prior to centering, and FIG. 7 shows the form of element seen in FIG. 6, after shrinkage.

FIG. 1 shows a stack 1 of stator laminations containing numerous grooves 2 in which the winding is laid. The mouths of the grooves are disposed at the cylindrical inner surface 3 of the stator. The rotor 4, shown as a broken line, has to be inserted and centered at this point. After centering, the stack of stator laminations is secured, with the help of screws extending through holes 5, to the body of the motor (not illustrated) which carries the bearing for the rotor.

A uniform air-gap 7 is obtained between the stator and the rotor in a simple manner with the help of the filling elements 6 of the invention.

A filling element 6 is illustrated in FIGS. 2 and 3. It also acts as an element for closing the groove and comprises a main part 8, a neck 9 and a head 10, which projects beyond the circumferential face 3 to an extent equal to the width of the air-gap 7. The other end of the filling element 6 comprises a widened cross-sectional portion 11 for clamping in the groove. The grooves 2 are filled with wires 12 constituting the winding. These are held in the groove and separated from the filling element 14 by means of an interposed strip 13. By the application of heat, generated for example when the winding 12 warms up, the filling element 6 is caused to shrink to the shape illustrated in FIG. 5, in which form the head 10 retracts completely into the groove 2.

The filling elements 6, like the other elements for closing the grooves, are inserted into the grooves 2 after the stack of stator laminations has been wound. The rotor can then be introduced and fixed in the correct centered position in relation to the stator. For this purpose, the screws extending through the holes 5 can be tightened and the stack of stator windings thus secured to the body of the motor. Current is then passed to the winding 12, whereupon the heads 10 of the filling elements 6 are caused to retract into the groove 2 as the result of their shrinking. Even if the filling element 6 shrinks to such an extent that its main part 8 no longer completely fills that portion of the groove 2 not occupied by the winding 12, there is no danger of the filling elements falling out, since after shrinkage the main part 8 is still wider than the mouth 14 of the groove. Furthermore, the filling element is firmly clamped in the groove by its widened cross-sectional portion 11.

FIGS. 6 and 7 illustrate a further embodiment. Here, a filling element 15 having a cavity 16 is employed. The head 17 is constituted by two outwardly extending ribs. When the filling element 15 contracts, these ribs are drawn into the groove.

I claim:

1. A rotor centering method for an electric motor of the type having a rotor and a stator with circumferentially arranged grooves containing windings and an air gap between the rotor and the stator; said method comprising the steps of providing at least three elongated spacer elements having head, neck and shoulder portions with said head portions being equal to said air gap; inserting said spacer elements in circumferentially spaced ones of said grooves so that only said spacer element heads protrude radially from said grooves, said heads protruding a distance approximately equal to said air gap between the rotor and the stator inserting said rotor into the bore of said stator in aligned relation to said spacer element heads and said stator; fixing said rotor in said aligned relation; and shrinking said spacer element heads into said grooves, said spacer elements being made with heat shrinkable material.

2. A method according to claim 1 wherein said spacer elements close said grooves in which they are inserted.

3. A method according to claim 1 wherein said head portions are wider than the widths of the mouths of said grooves.

4. A method according to claim 1 wherein said spacer elements have hollow cross sections.

5. A method according to claim 1 wherein said shoulder portions are of a width relative to the mouths of said grooves so that said shoulder portions remain wider than said mouths after shrinkage of said shoulder portions occur.

6. A method according to claim 1 wherein said spacer elements have a widened portion at one end thereof which exceeds the width of said shoulder portion.

7. A method according to claim 1 wherein the material of said spacer elements is polyvinyl fluoride.

8. A method according to claim 1 wherein at least some of said windings in said grooves in which said spacer elements are inserted are starting windings.

9. A method according to claim 1 wherein current is passed through at least a part of said winding to generate a shrinking temperature for said spacer elements.

* * * * *